(12) United States Patent
Degenkolb et al.

(10) Patent No.: US 9,961,062 B2
(45) Date of Patent: May 1, 2018

(54) CENTRALIZED AUTHENTICATION SERVER FOR PROVIDING CROSS-DOMAIN RESOURCES VIA A REST-BASED TUNNEL

(71) Applicant: SAP SE, Walldorf (DE)

(72) Inventors: Marko Degenkolb, Wiesloch (DE); Sascha Kiefer, Kirkel (DE); Christian Schmitz, Altlussheim (DE); Stefan Schreck, St. Leon-Rot (DE)

(73) Assignee: SAP SE, Walldorf (DE)

( * ) Notice: Subject to any disclaimer, the term of this patent is extended or adjusted under 35 U.S.C. 154(b) by 296 days.

(21) Appl. No.: 14/805,006

(22) Filed: Jul. 21, 2015

(65) Prior Publication Data

US 2017/0026339 A1 Jan. 26, 2017

(51) Int. Cl.
*G06F 17/00* (2006.01)
*H04L 29/06* (2006.01)
*H04L 29/08* (2006.01)
*H04L 12/911* (2013.01)

(52) U.S. Cl.
CPC .......... *H04L 63/08* (2013.01); *H04L 63/0281* (2013.01); *H04L 47/825* (2013.01); *H04L 67/02* (2013.01)

(58) Field of Classification Search
CPC .. G06F 21/41; G06F 21/72; G06F 2221/2111; G06F 21/6218; G06F 21/604; G06F 21/629; G06F 21/45; G06F 2009/45587; G06F 21/305; G06F 21/53; G06F 2221/2133; G06F 2221/2149; G06F 9/45558; H04L 47/825; H04L 63/029; H04L 63/08; H04L 63/0815; H04L 63/0838; H04L 63/0884; H04L 63/10; H04L 63/20; H04L 67/02

See application file for complete search history.

(56) References Cited

U.S. PATENT DOCUMENTS

2013/0013704 A1* 1/2013 Pope ................... H04L 61/1541 709/206
2015/0089620 A1* 3/2015 Manza ................ H04L 63/0838 726/8

* cited by examiner

*Primary Examiner* — Abiy Getachew
(74) *Attorney, Agent, or Firm* — Schwegman Lundberg & Woessner, P.A.

(57) ABSTRACT

In various example embodiments, an authentication server provides a secure communication pathway between a client device and a service provider. The authentication server has been previously authenticated with the service provider and establishes a tunnel for receiving requested information from the service provider. The tunnel is implemented according to Representational State Transfer ("REST") principles, so the client device can send one or more REST requests to the authentication server, which then redirects such requests to the service provider via the established tunnel. In addition, the client device may be previously authenticated with the authentication server such that the client device does not need to explicitly authenticate to the service provider each time information is requested. In some embodiments, the authentication server may be in communication with intermediary servers, which, in turn, are also authenticated with the service provider, and requests for information are routed through the intermediary servers.

20 Claims, 7 Drawing Sheets

CENTRALIZED AUTHENTICATION SERVER FOR PROVIDING CROSS-DOMAIN RESOURCES VIA A REST-BASED TUNNEL

TECHNICAL FIELD

Embodiments of the present disclosure relate generally to data processing and analysis and, more particularly, but not by way of limitation, to a centralized service provider for providing cross-domain resources via a REST tunnel.

BACKGROUND

An application running on a client device on a business' intranet may be configured to obtain content from different sources. For example, the application may obtain content from a service provider that provides social media content, such as Twitter®, Facebook®, and Google+™. The business may also implement a local application server on the business' intranet, such as SAP Jam, which is available from SAP AG.

Conventionally, the content obtained from the service provider is through RESTful services using a communication protocol. REST (Representational State Transfer) is an architecture style for designing networked applications that relies on a stateless, client-server, cacheable communications protocol, such as HTTP. However, as the service provider is likely to reside outside the business' intranet, it is important to establish a secure and trusted connection to the service provider when requesting content via its REST application programming interface (API). Technologies to establish these secured and trusted connections include HTTP over SSL (HTTPS), OAUTH 2.0, and the Security Assertion Markup Language (SAML). These technologies implement the exchanging and signing of security certificates to authenticate a requester of content or an available service. However, configuring a single client to support these technologies takes a non-trivial amount of time and effort and, in a business environment, hundreds or thousands of such clients must be configured accordingly.

In addition, many client devices implement security policies that make it difficult to obtain content from different external providers in a cohesive manner. One example policy typically implemented on the client-side is the Same-Origin-Policy (SOP), which does not allow a web application containing client-side scripting (e.g., JavaScript) to display content coming from different service providers. In other words, SOP permits scripts contained in a first web page to access data in a second web page, but only if both web pages have the same origin (e.g., the same domain).

BRIEF DESCRIPTION OF THE DRAWINGS

Various ones of the appended drawings merely illustrate example embodiments of the present disclosure and should not be considered as limiting its scope.

Figure 1:
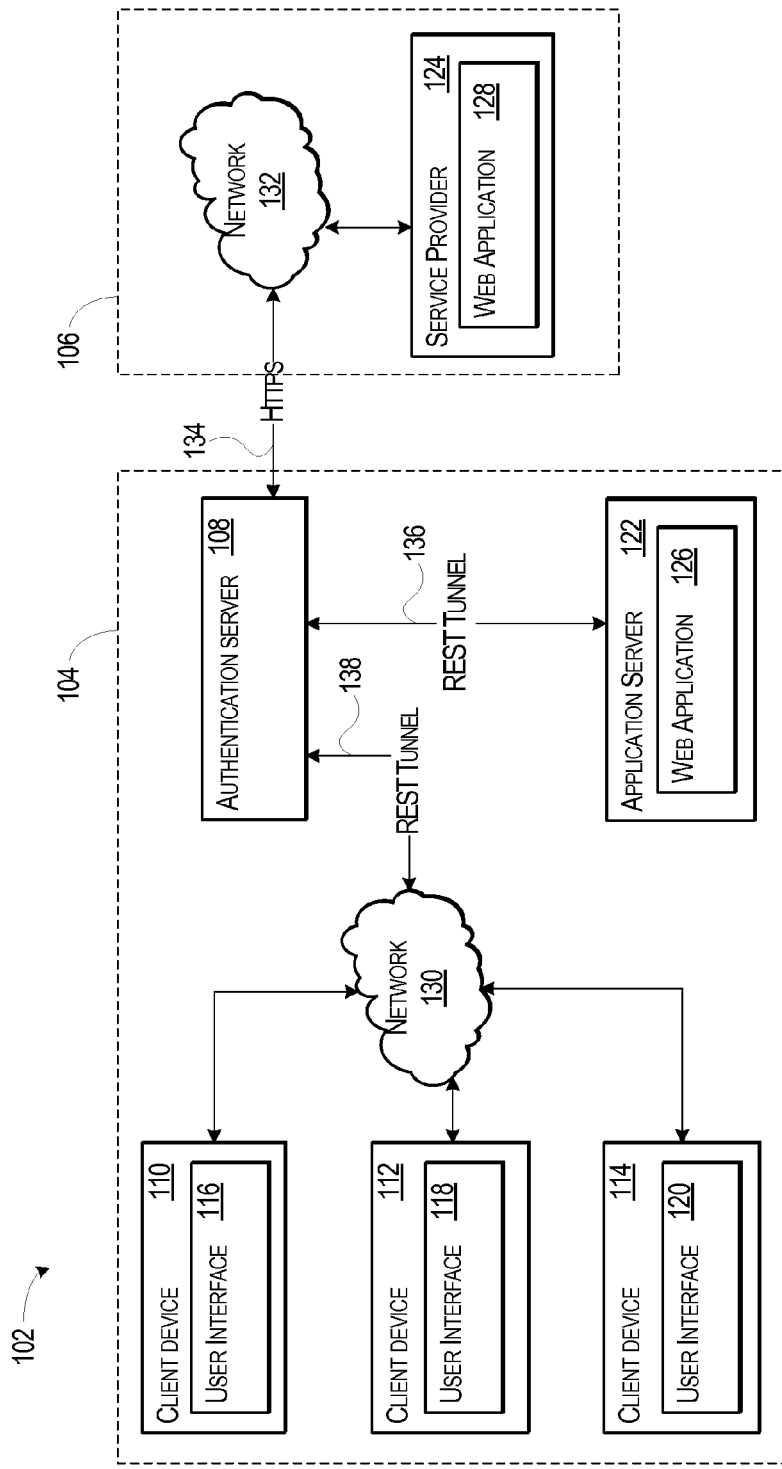
FIG. 1 is a block diagram illustrating a networked environment, in accordance with one embodiment, in which an authentication server is in communication with various client devices, a application server, and a service provider.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various example embodiments, this disclosure provides an authentication server that facilitates secure communications between a client device and a service provider. The client device and the authentication server are in communication via a local intranet, and the client device may instantiate various web-based applications, which implement Representational State Transfer ("REST") principles to obtain resources from one or more service providers residing outside of the intranet. The client device may use various authentication mechanisms to authenticate with the authentication server, such as a username and password. Once authenticated with the authentication server, the authentication server forwards REST requests for resources to the service provider and, in turn, sends responses (e.g., the requested resources) from the service provider to the client device. In this manner, the authentication server may engage in communications with different service providers on behalf of a client device requesting resources from these service providers. This implementation is technically advantageous where a web-based application executed by the client device is requesting resources from different service providers residing at different domains, which would ordinarily violate a client-side Same-Origin Policy.

In addition, there may be instances where the service provider communicatively resides behind an intermediary server communicatively residing between the authentication server and the service provider. In these instances, the authentication server and the intermediary server may engage in authentication mechanism that authenticates the client device without the user having to provide authentication credentials to the intermediary server. In particular, the authentication server and the intermediary server may leverage assertion tickets, which are a form of bearer token used by a server, such as an SAP NetWeaver Application Server (AS), to identify a user to another server, such as another SAP NetWeaver AS. With assertion tickets, the authentication server issues the assertion ticket on the behalf of the current user for consumption by the intermediary server. In this manner, the user is authenticated with the intermediary server and, therefore, may obtain the resources provided by the service provider communicatively coupled to the intermediary server. This implementation reduces the time and effort needed to configure the client device (or other client devices) to specifically obtain access to the intermediary server or having the user of the client device provide authentication credentials each time the intermediary server is accessed.

FIG. 1 is a block diagram illustrating a networked environment 102, according to one embodiment, in which an authentication server 108 is in communication with various client devices 110-114, a application server 122, and a service provider 124. In one embodiment, the networked environment 102 includes an intranet 104, which includes the authentication server 108, the application server 122, a network 130, and various client devices 110-114, and an extranet 106 (e.g., the Internet), which includes the a network 132 and a service provider 124.

The authentication server 108 provides server-side functionality via the network 130 (e.g., a local area network) to one or more client devices 104-108. The one or more client devices 110-114 are configured to execute one or more types of client applications having a user interface 116-120 that access resources available from the application server 122 and the service provider 124 via the authentication server 108. Examples of such applications include a web client (e.g., a browser, such as the Internet Explorer® browser developed by Microsoft® Corporation of Redmond, Wash. State), an application, or a programmatic client. An example of a user interface 116-120 implemented by the client devices 110-114 include SAP Fiori, which is available from SAP AG.

The client devices 110-114 may comprise, but are not limited to, a mobile phone, desktop computer, laptop, portable digital assistants (PDAs), smart phones, tablets, ultrabooks, netbooks, laptops, multi-processor systems, microprocessor-based or programmable consumer electronics, game consoles, set-top boxes, or any other communication device that a user may utilize to access the resources available from the application server 122 and/or the service provider 124. In some embodiments, the client devices 110-114 may comprise a display module (not shown) to display information (e.g., in the form of user interfaces 116-120). In further embodiments, the client devices 110-114 may comprise one or more of a touch screens, accelerometers, gyroscopes, cameras, microphones, global positioning system (GPS) devices, and so forth. The client devices 110-114 may be a device of a user that is used to access a member profile (e.g., a user profile) associated with the user.

One or more users of the client devices 110-114 may be a person, a machine, or other means of interacting with the client devices 110-114. In various embodiments, the users of the client devices 110-114 are not part of the network environment 102 shown in FIG. 1, but may interact with the application server 122 and/or the service provider 124 via the client devices 110-114 or another means. For instance, the user provides input (e.g., touch screen input or alphanumeric input) to the client device 110 and the input is communicated to the application server 122 and/or the service provider 124 via the networks 130-132. In this instance, the application server 122, in response to receiving the input from the user, communicates information to the client devices 110-114 via the network 130 to be presented to the user. In this way, the user can interact with the application server 122 and/or the service provider 124 by using the client devices 110-114.

The network 130 and/or the network 132 may include a variety of networks for facilitating communications between the client devices 110-114 and the authentication server 108 (e.g., via network 130) and for facilitating communications between the client devices 110-114 and the application server 122 and/or the service provider 124 (e.g., via networks 132-130). For example, networks 130-132 include one or more portions of network 118 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMAX network, another type of network, or a combination of two or more such networks. In one embodiment, the network 130 defines an intranet 104 that communicatively couples client device 110-114 and the authentication server 108, and network 132 defines an extranet 106 that communicatively couples client devices 110-114 and authentication server 108 with the application server 122 and/or the service provider 124.

Each of the client devices 110-114 may include one or more applications (also referred to as "apps") such as, but not limited to, a web browser, messaging application, electronic mail (email) application, a social networking application, and the like. In some embodiments, if the social networking application is included in a given one of the client devices 110-114, then this application is configured to locally provide the user interface 116-120 and at least some of the functionalities with the application configured to communicate with the application server 122 and/or the service provider 124, on an as needed basis, for data and/or processing capabilities not locally available. Conversely if the social network application is not included in one or more of the client devices 110-114, the client devices 110-114 may use its web browser to access the social networking service hosted on the social network server 110-114.

The application server 122 and/or the service provider 124 include one or more web applications 126-128 for providing resources to the client devices 110-114. In one embodiment, the application server 122 is an SAP Jam server, available from SAP AG, and provides an application programming interface ("API") for interacting with the application server 122. The SAP Jam API may be implemented as an OData/REST-based web service (e.g., web application 126) allowing web, desktop, and mobile applications (e.g., client devices 110-114) to connect to and interact with the application server 122. In addition, the application server 122 may be assigned a first domain (e.g., a URI) at which it may be located. Similarly, the service provider 124 may provide another OData/REST-based web service (e.g., web application 128) for providing content (e.g., resources) to the client devices 110-114. Examples of a service provider 124 include Windows Azure®, which is available from the Microsoft Corp., a SharePoint® server, which is also available from the Microsoft Corp., Facebook® (via the Facebook Graph API), and other such service providers having an OData- or REST-based web service. The service provider 124 may be assigned a second domain at which it may be located. The first domain assigned to the application server 122 and the second domain assigned to the service provider 124 may also be different domains.

In one embodiment, the application server 122 and the service provider 124 provide their respective resources (e.g., information) using a REST-based architecture. Accordingly, the client devices 110-114 may instantiate applications that leverage such resources, but may be constrained in retrieving such resources due to security one or more security policies (e.g., a single-domain policy). To overcome these constraints, the authentication server 108 implements one or more REST-based tunnels 136,138 between it and the one or more client devices 110-114 and the application server 122. In addition, when the authentication server 108 communicates with the service provider 124, the authentication server 108 communicates using a secure protocol, such as HTTPS. Using the REST-based tunnels 136,138, along with the secure communication pathway 134, one or more of the client devices 110-114 can obtain resources from the application server 122 and the service provider 124 via the authentication server 108 without violating a single-domain policy that may be enforced for devices within the intranet 104.

Further still, the authentication server 108 uses various authentication schemes to ensure that the connection between the client devices 110-114 and the application server 122 and the service provider 124 is a secure one. With regard to the client devices 110-114, the authentication server 108 may request that a user provide a username and password to authenticate himself or herself with the authentication server 108. In an alternative embodiment, because the client devices 110-114 may reside on an intranet with the authentication server 108, the authentication server 108 may leverage intranet-based security policies (e.g., known MAC address, static IP addresses, etc.) to authenticate a given user such that the user simply provides his or her username, e-mail address, or other login credential, to access or obtain resources from the authentication server 108. In this manner, the authentication server 108 implements a single sign-on policy ("SSO policy") such that a user's two-factor authentication (e.g., username and password) is not required to access the resources provided by the authentication server 108 via the REST-based tunnels 136,138.

In addition to user-based or client-based authentication policies, the authentication server 108 may leverage system-based or server-based authentication policies in communicating with the application server 122 and/or the service provider 124. For example, in one embodiment, the authentication server 108 exchanges security tokens and/or authentication credentials with the application server 122 and/or the service provider 124. Thus, when the authentication server 108 communicates with the application server 122 and/or the service provider 124, the application server 122 and/or the service provider 124 rely on the authentication credentials of the authentication server 108 rather than the authentication credentials of each individual client device 110-114. In this manner, the client devices 110-114 do not need to be individually authenticated (or configured for authentication) with the application server 122 and/or the service provider 124. Furthermore, and as discussed below with reference to FIG. 4, the client devices 110-114 may access the REST tunnel 134 via a Uniform Resource Identifier ("URI") that has a common second-level domain name and a common top-level domain name, such that the Single Sign-On policy is not violated when resources are requested from either the application server 122 and the service provider 124 during a single instance of a given web application.

FIG. 2A is a block diagram illustrating another networked environment 202, in accordance with another embodiment, in which an application server 216 communicates with a service provider 218 via the authentication server 108. In this embodiment, the networked environment 202 includes three distinct network groupings: a first grouping 204 that includes the client device 110, a second grouping 206 that includes the authentication server 108 and the application server 216, and a third grouping 208 that includes the service provider 218. In one embodiment, the second grouping 206 includes an intranet, and the first grouping 204 and the third grouping 208 reside outside this intranet. The first grouping 204 and the third grouping 208 are communicatively coupled to the second grouping 206 via networks 210,214, which may include an extranet or wide area network, such as the Internet.

To securely provide REST-based services to the client device 110, the authentication server 108 implements a REST-based tunnel 224 with the application server 206, which, in turn, securely communicates with the service provider 218 via a secured communication protocol 226, such as HTTPS. The authentication server 108 also implements a REST-based tunnel 230 with the client device 110. Further still, the authentication server 108 may be authenticated with the application server 216 such that the user of the client device 110 does not need to separately authenticate with the application server 216. By invoking the REST-based tunnels 224,230 the client device 110 can securely request resources from the web application 222 instantiated by the service provider 218.

To authenticate with the application server 216, the authentication server 108 leverages an assertion authentication mechanism 228. The application server 216 may also include an assertion authentication mechanism 220 as well. Each of the authentication assertion mechanisms 220,228 may generate an assertion authentication ticket. Authentication assertion tickets are a form of bearer token used by some servers, such as an SAP NetWeaver Application Server, to identify a user to another server, such as another SAP NetWeaver AS. In other words, the authentication server 108 issues the assertion ticket on the behalf of the current user. The assertion authentication ticket is typically carried in the HTTP header of the communication between the two systems. To guarantee the integrity and authenticity of the assertion ticket, the system that issues the ticket (e.g., the authentication server 108) signs the ticket with its own digital signature.

In this manner, neither the client device 110 nor the authentication server 108 may be specifically authenticated with the service provider 218. Instead, the authentication server 108 endorses the user of the client device 110 to the application server 216 via the assertion authentication mechanism 220. Similarly, the application server 216 may endorse the user with the service provider 218 via the assertion authentication mechanism 220. Thus, regardless of how the authentication server 108 communicates with the service provider 218, the disclosed REST-based tunneling ensures that the client devices 110-114 can obtain resources from service providers using a REST-based architecture, even when those services providers operate within different domains.

Figure 3:
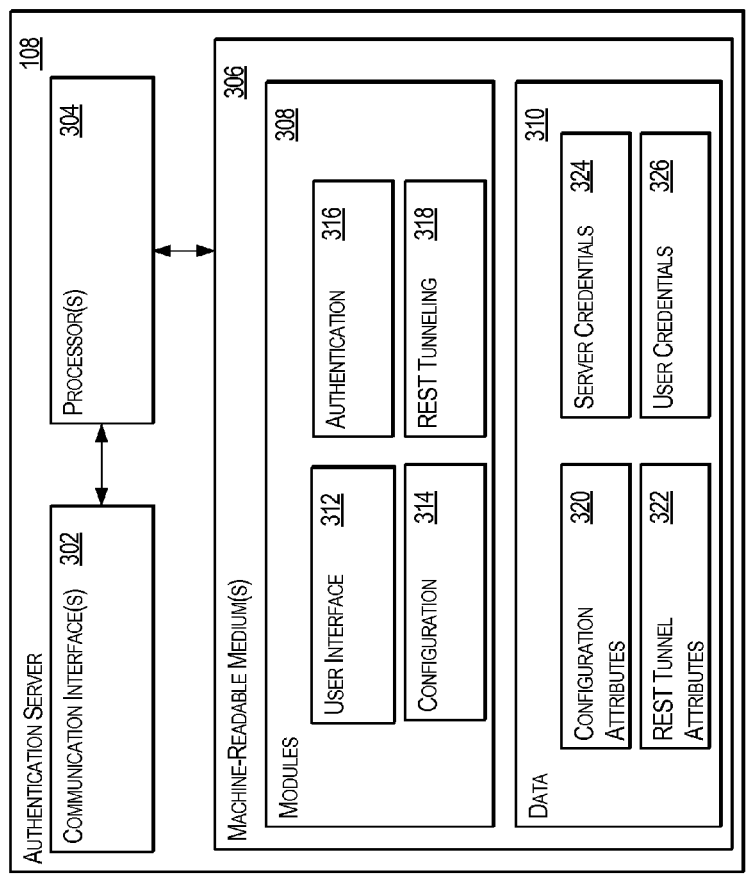
FIG. 3 is a block diagram illustrating the components of the authentication server of FIG. 1 in accordance with an example embodiment.

FIG. 3 is a block diagram illustrating the components of the authentication server 108 of FIG. 1 in accordance with an example embodiment. In one embodiment, the authentication server 108 includes one more communication interfaces 302 in communication with one or more processors 304. The one or more processors 304 are communicatively coupled to one or more machine-readable mediums 306, which include modules 308 for implementing the disclosed REST-based tunnel and data 310 to support the execution of the modules 308.

The various functional components of the authentication server 108 may reside on a single device or may be distributed across several computers in various arrangements. The various components of the authentication server 108 may, furthermore, access one or more databases, and each of the various components of the authentication server 108 may be in communication with one another. Further, while the components of FIG. 3 are discussed in the singular sense, it will be appreciated that in other embodiments multiple instances of the components may be employed.

The one or more processors 304 may be any type of commercially available processor, such as processors available from the Intel Corporation, Advanced Micro Devices, Texas Instruments, or other such processors. Further still, the one or more processors 304 may include one or more special-purpose processors, such as a Field-Programmable Gate Array (FPGA) or an Application Specific Integrated Circuit (ASIC). The one or more processors 304 may also include programmable logic or circuitry that is temporarily configured by software to perform certain operations. Thus, once configured by such software, the one or more processors 304 become specific machines (or specific components of a machine) uniquely tailored to perform the configured functions and are no longer general-purpose processors.

The one or more communication interfaces 302 are configured to facilitate communications between the authentication server 108, the various client devices 110-114, the service provider 124 (as shown in FIG. 1), the application server 216 (as shown in FIG. 2A), and the service provider 218 (as shown in FIG. 2A). The one or more communication interfaces 302 may include one or more wired interfaces (e.g., an Ethernet interface, Universal Serial Bus ("USB") interface, a Thunderbolt® interface, etc.), one or more wireless interfaces (e.g., an IEEE 802.11b/g/n interface, a Bluetooth® interface, an IEEE 802.16 interface, etc.), or combination of such wired and wireless interfaces.

The machine-readable medium 306 includes various modules 308 and data 310 for implementing the disclosed REST-based tunnel (e.g., tunnel 134 and/or tunnel 224). The machine-readable medium 306 includes one or more devices configured to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the modules 308 and the data 310. Accordingly, the machine-readable medium 306 may be implemented as a single storage apparatus or device, or, alternatively and/or additionally, as a "cloud-based" storage systems or storage networks that include multiple storage apparatus or devices. As shown in FIG. 3, the machine-readable medium 306 excludes signals per se.

The user interface module 312 is configured to provide a user interface, such as a graphical user interface, for interacting with the authentication server 108. In one embodiment, the user interface module 212 provides the graphical user interface via a programmatic client installed on the one or more client devices 110-114. In another embodiment, the user interface module 312 provides the graphical user interface via a web service accessible by a web browser installed on the one or more client devices 110-114. The graphical user interface provided by the user interface module 312 facilitates the configuration of the REST tunneling module 318 via the configuration module 314. In addition, the graphical user interface provided by the user interface module 312 facilitates interactions with the authentication mechanisms employed by the authentication server 108 via the authentication module 316.

The configuration module 314 is configured to store configurations of one or more REST tunnels that the authentication server 108 may implement. In one embodiment, each REST tunnel (e.g., REST tunnel 224) has various attributes and the values for these attributes may be selected via the configuration module 314. The configuration attributes and corresponding selectable attribute values may be stored as configuration attributes 320. Thus, when the configuration module 314 is invoked to implement a new REST tunnel, the configuration module 314 reads from the configuration attributes 320 to provide the various options for defining the server to be addressed via the REST tunnel.

In one embodiment, the configuration attributes 320 include a tunnel destination, a service provider type, an application identifier, a service root, a resource path, and an authentication context. The tunnel destination attribute identifies the destination for the tunnel. The service provider type identifies the type of service provider to which the tunnel is being connected. The application identifier identifies the web application provider by the service provider. The service root identifies the path on the service provider where the web application (e.g., the service) can be found. The resource path identifies the resource provided by the service specified by the service root. Finally, the authentication context identifies how the authentication is being handled. In some embodiments, each of the attributes may include a selectable menu of values for populating a given attribute; in other embodiments, a user or administrator of the authentication server 108 enters in a valid value (e.g., by typing on a keyboard). Once a given tunnel is configured, the values for the configured tunnel are then stored as REST tunnel attributes 322. Each REST tunnel maintained by the authentication server 108 may have a separate entry in the REST tunnel attributes 322, where an entry includes the attribute values for the corresponding REST tunnel.

The authentication module 316 is configured to perform the authentication for a given client device 110-114 and to authenticate the authentication server 108 with another system, such as the application server 122, the service provider 124, the application server 216, or the service provider 218. As discussed previously, the authentication module 316 may leverage a username and password combination to authenticate a user, which may be stored as user credentials 326. Alternatively, the authentication server 108 may leverage a hardware identifier, such as a MAC address, to authenticate a specific client device 110-114.

In alternative embodiments, the user credentials 326 may also include username and password combinations for specific resources provided by the service provider 124, 218 or the application server 122. For example, the authentication server 108 may require that a user provided a given username and password for access to the REST-based tunnel, and the service provider 124,218 or the application server 122 may require a separate username and password to access the provided service. In this embodiment, the user credentials 326 may include a mapping that associates a user's credentials for the authentication server 108 with the user's credentials for the provided service of corresponding service providers (e.g., a one-to-many mapping). In this manner, the user of the client device 110-114 needs only to authenticate once with the authentication server 108, which then handles the user's authentication with other service providers.

In some instances, where the authentication server 108 is configured to authenticate itself with other systems, the authentication module 316 leverages the server credentials 324 to authenticate the authentication server 108. In one embodiment, the server credentials 324 include one or more assertion tickets, which the authentication server 108 issues on behalf of the user requesting access to a given service provider. As discussed with reference to FIG. 2, the server credentials 324 may further include a digital signature that the authentication server 108 uses to sign (e.g. via a digital signature scheme, such as RSA, Lamport, and other such schemes.)

The REST tunneling module 318 is configured to implement the one or more REST tunnels defined by the REST tunnel attributes 322. In one embodiment, the REST tunneling module 318 is invoked when a client device 110-114 provides a specific URI to the authentication server 108. After authenticating the client device 110-114 and/or the authentication server 108, the REST tunneling module 318 then handles requests for information from the client devices 110-114 and responses to such requests. In this manner, the REST tunneling module 318 effectively acts as an intermediary between the client device 110-114 and a service provider (e.g., the application server 122, service provider 124, or the service provider 218).

Figure 4:
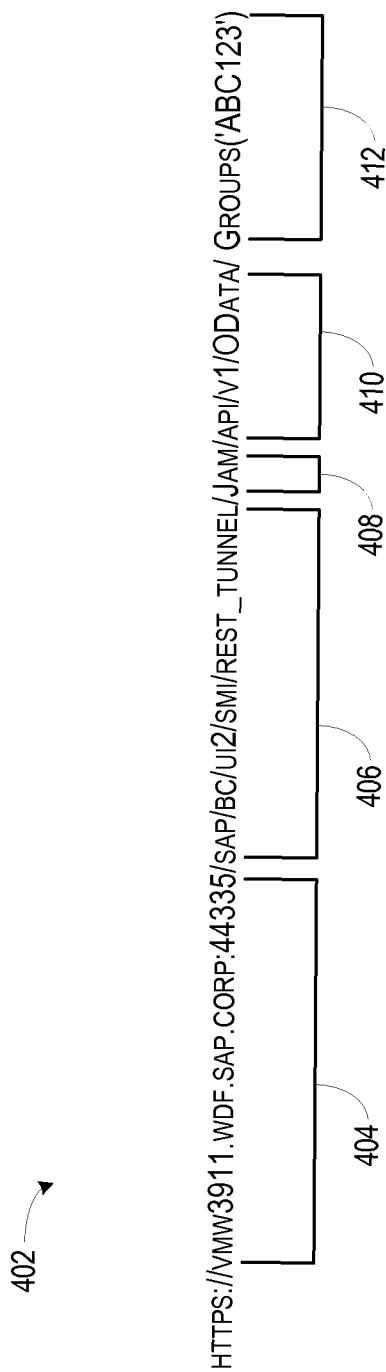
FIG. 4 illustrates the various portions of a Uniform Resource Identifier for accessing a REST-based tunnel provided by the authentication server in accordance with an example embodiment.

FIG. 4 illustrates the various portions of a Uniform Resource Identifier 402 for accessing a REST-based tunnel provided by the authentication server 108 in accordance with an example embodiment. In one embodiment, the URI 402 includes five segments 404-412. The first segment 404 includes a back-end host identifier that identifies a back-end host and a port identifier that identifies a port of the back-end host; the second segment 406 includes a node path identifier that identifies a node of the back-end host that implements a given REST-based tunnel; the third segment 408 includes a tunnel destination identifier that identifies a destination for the REST-based tunnel; the fourth segment 410 includes a service root identifier that identifies a service of the service provider specified in the destination; and, the fifth segment 412 includes a resource path identifier that identifies a resource provided by the service provider. By evaluating the REST tunnel attributes 322, the destination designated in the third segment 408 gets connected with the service provider type and the service root node that is to be addressed.

As shown in FIG. 4, the URI 402 represents a logical (e.g., virtual) location for the service provider specified in the URI 402. Furthermore, the URI 402 does not violate a Single-Domain Policy because the second-level domain name and the top-level domain name specified in the first segment 404 for each REST-based tunnel instantiated by the authentication server 108 would be the same. Accordingly, a web application instantiated on one or more of the client devices 110-114 could obtain access REST-based services from different service providers that are actually assigned different second-level domain names or top-level domain names by accessing the REST-based tunnels implemented by the authentication server 108. In this manner, the disclosed authentication server 108 overcomes the limitations typically imposed by web browsers that prevent a web application from obtaining resources from two different domains.

Figure 5:
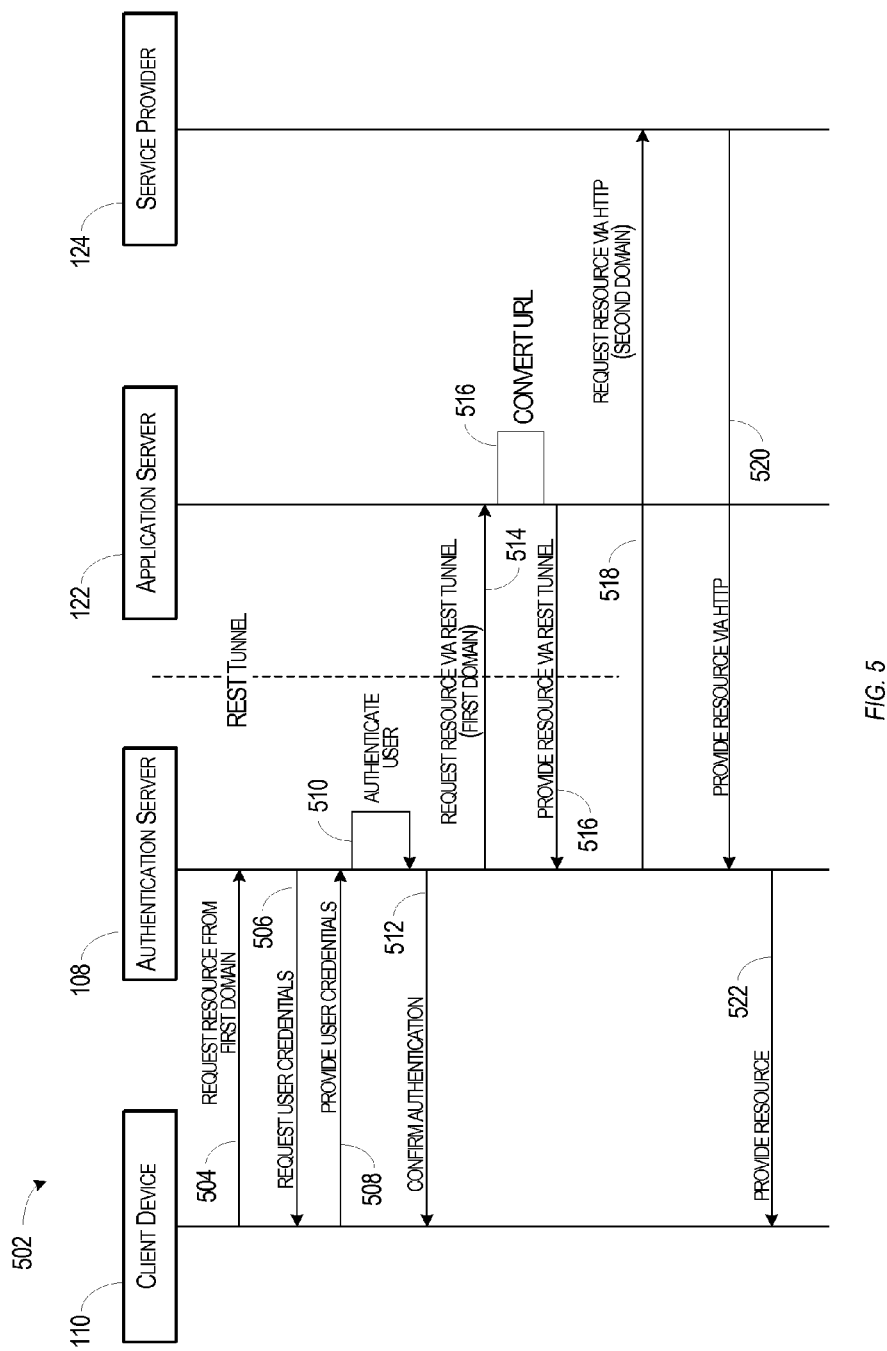
FIG. 5 illustrates a message passing diagram, in accordance with an example embodiment, where the authentication server is being used to provide a REST-based tunnel between the various devices of the networked environment of FIG. 1.

FIG. 5 illustrates a message passing diagram 502, in accordance with an example embodiment, where the authentication server 108 is being used to provide a REST-based tunnel between the various devices of the networked environment 102 of FIG. 1. The message passing diagram 502 may be implemented by one or more of the modules 308 of the authentication server 108 and is discussed by way of reference thereto. While the message passing diagram 502 is intended to illustrate requesting resources from two service providers associated with different domains, one of ordinary skill in the art will recognize that the client device may send request to other service providers at other domains or service providers all residing at the same domain.

Initially, the authentication server 108 receives a request from one or more of the client devices 110-114 for a resource provided by the application server 122 at the first domain (Operation 504). The authentication server 108 then sends a reply, via the authentication module 316, that the requesting client device should provide authentication credentials to access the authentication server 108 (Operation 506). The client device then provides the authentication credentials, which, in one embodiment, may include a username and/or password for a user using the requesting client device (Operation 508). In alternative embodiments, the credentials may include a single-factor authentication, such as a username or e-mail address, as the client device 110 and the authentication server 108 may reside on the same intranet, in which case, the connection between the client device 110 and the authentication server 108 is presumed secured. In yet another embodiment, should the user of the client device 110 already authenticate with the authentication server 108 prior to Operation 504, then the authentication of the client device 110 may be presumed, in which case, Operations 506-512 may be omitted.

The authentication server 108 then authenticates the client device with the provided authentication credentials (Operation 510). If authentication succeeds, the authentication server 108 may then communicate a response to the client device notifying the client device that the authentication credentials were accepted (Operation 512). The client device may or may not display a message to the user indicating whether the authentication credentials were accepted.

Provided that the authentication server 108 accepts the authentication credentials from the client device, the authentication server 108 then forwards the request for the resource to the application server 122 via the REST tunneling module 318 (Operation 514). While it is not shown in FIG. 5, the application server 122 may then request authentication from the authentication server 108. For example, the authentication server 108 may provide an assertion authentication ticket via the Provided that authentication succeeds, the application server 122 then converts the REST tunnel to a URL local to the application server 122 (Operation 516). Then authentication 108 then provides the resource to the authentication server 108 (Operation 518).

The client device may then request additional resources (e.g., information) from the service provider 124 associated with a second domain (Operation 520). As the second request may occur during the same session as the first request, the authentication server 108 may forego authentication of the client device. The authentication server 108 then communicates the requested information to the service provider 124 via using the URL converted by the application 122, such as by HTTP (Operation 518). As the authentication server 108 may not have authenticated previously with the service provider 124, the service provider 124 may request authentication to access the requested resource (e.g., via an assertion authentication ticket). Once authenticated the service provider 124 then communicates the requested resource to the authentication server 108 via HTTP (Operation 520). Accordingly, the authentication server 108 then communicates the received resource to the requesting client device 110 (Operation 522).

Figure 2:
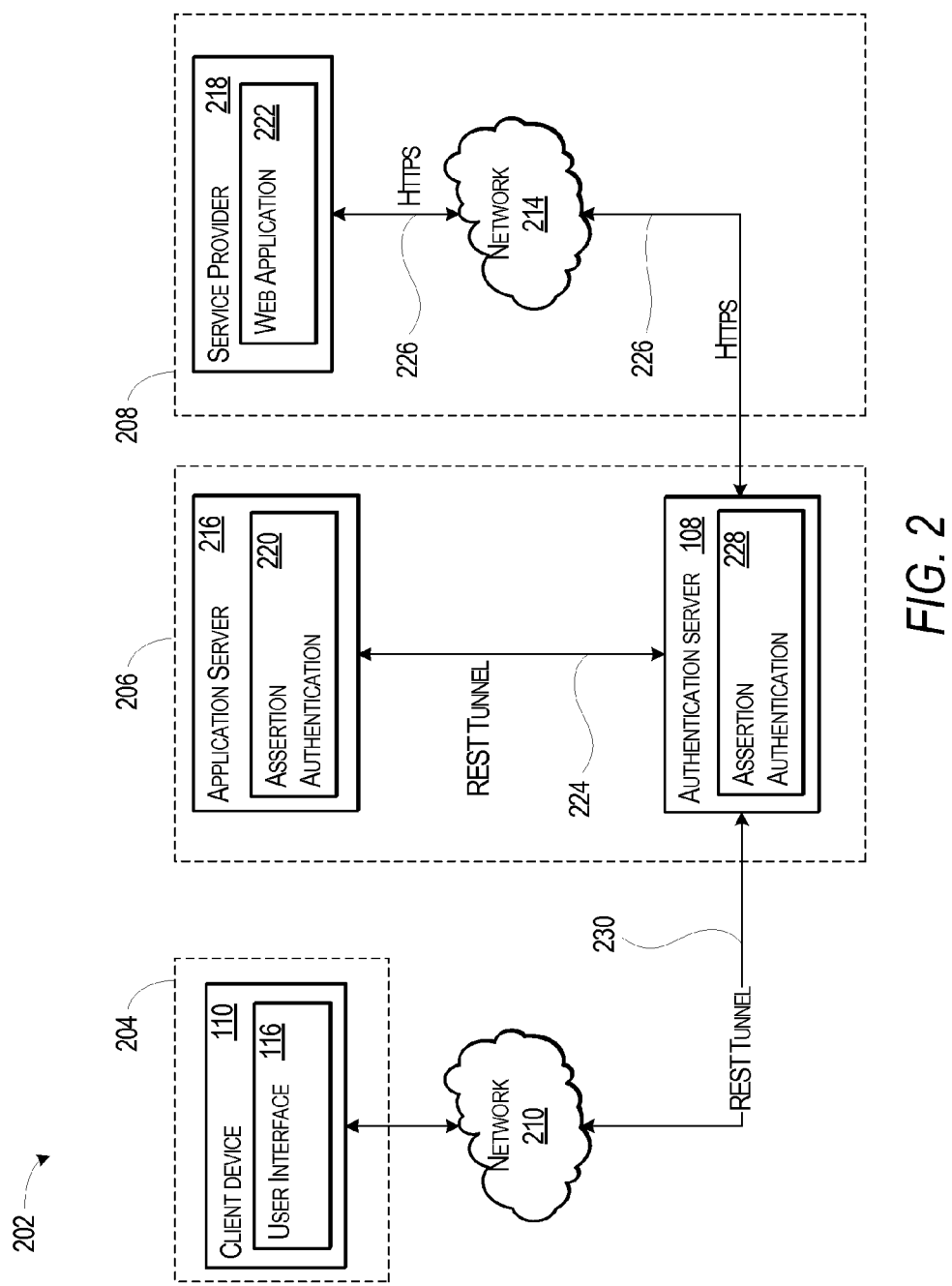
FIG. 2 is a block diagram illustrating another networked environment, in accordance with another embodiment, in which an authentication server communicates with a service provider via an intermediary application server.
Figure 6:
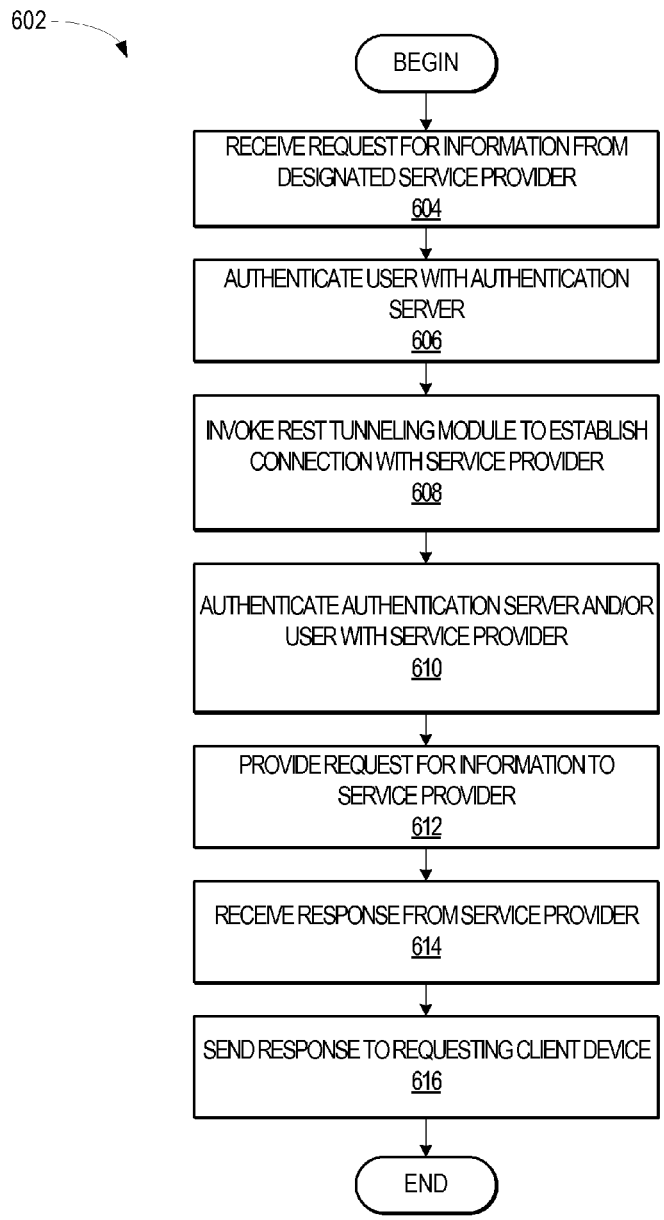
FIG. 6 illustrates a method, in accordance with an example embodiment, for implementing the disclosed REST-based tunnel of the authentication server illustrated in FIG. 2.

FIG. 6 illustrates a method 602, in accordance with an example embodiment, for implementing the disclosed REST-based tunnel of the authentication server illustrated in FIG. 2. The method 602 may be implemented by one or more of the modules 308 of the authentication server 108 and is described by way of reference thereto.

Initially, the authentication server 108 receives a request for information (e.g., resources) from a client device directed to a designated service provider communicatively coupled with the authentication server 108 (Operation 604). The authentication server 108 may then authenticate the client device to ensure that the client device is authorized to access the REST tunneling module 318 (Operation 606). Provided that authentication succeeds, the authentication server 108 then sends the request for information to the designated service provider via the REST tunneling module (Operation 608). Should the authentication not succeed, the authentication server 108 may send a message to the client device indicating that there was a failure in the authentication process (not shown).

When the service provider receives the request from the authentication server 108, the service provider may request authentication to access the requested resource (Operation 610). In one embodiment, the authentication server 108 authenticates itself with the service provider, such as by sending a digital signature along with the request for information. In another embodiment, the authentication server 108 authenticates the request on behalf of the user (e.g., by way of an assertion authentication ticket) or by sending associated credentials stored in the user credentials 326.

Once authenticated the service provider then sends a response to the authentication server 108, which includes the requested information (Operation 614). The authentication server 108 then forwards the requested information to the requesting client device (Operation 616).

In this manner, the disclosed authentication server 108 and REST-based tunneling architecture facilitates communications between a client device and multiple service providers that may be associated with different domains. As the REST tunneling module 318 provides a common URI to each of the various service providers, a web application will not violate a Same-Origin Policy when it requests resources from the various service providers within the same session. Thus, the disclosed systems and methods overcome technical limitations that would normally prevent developers from designing web applications that take advantage of the range of available external resources.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-6 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the invention in different contexts from the disclosure contained herein.

Example Architecture and Machine-Readable Medium

Figure 7:
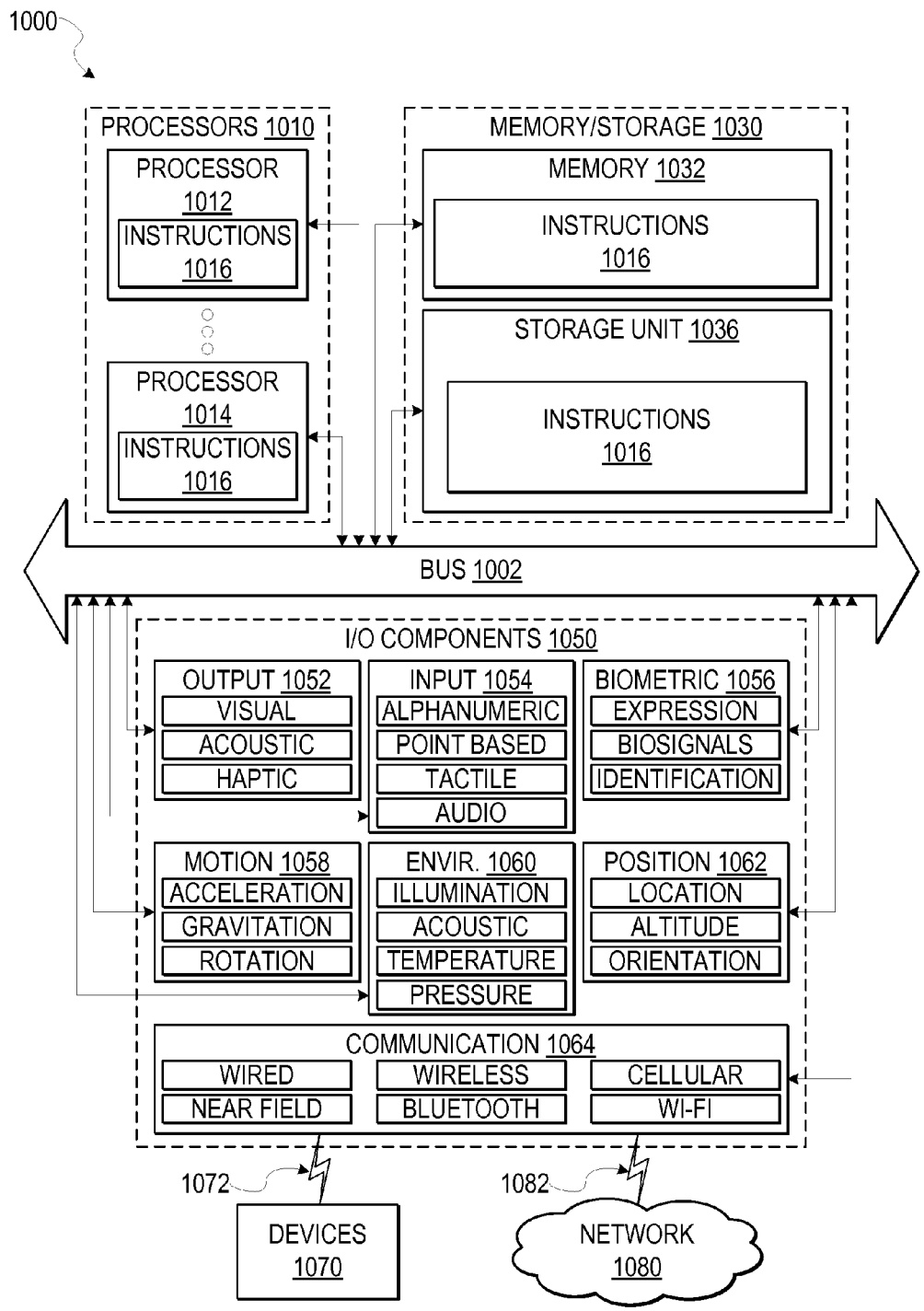
FIG. 7 illustrates a diagrammatic representation of a machine in the form of a computer system within which a set of instructions may be executed for causing the machine to perform any one or more of the methodologies discussed herein, according to an example embodiment.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example the instructions may cause the machine to execute the message passing or method diagrams of FIGS. 5-6. Additionally, or alternatively, the instructions may implement the modules 308 of FIG. 3. The instructions transform the general, non-programmed machine into a particular machine programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 712 and processor 714 that may execute instructions 716. The term "processor" is intended to include multi-core processor that may comprise two or more independent processors (sometimes referred to as "cores") that may execute instructions contemporaneously. Although FIG. 7 shows multiple processors, the machine 700 may include a single processor with a single core, a single processor with multiple cores (e.g., a multi-core process), multiple processors with a single core, multiple processors with multiples cores, or any combination thereof.

The memory/storage 730 may include a memory 732, such as a main memory, or other memory storage, and a storage unit 736, both accessible to the processors 710 such as via the bus 702. The storage unit 736 and memory 732 store the instructions 716 embodying any one or more of the methodologies or functions described herein. The instructions 716 may also reside, completely or partially, within the memory 732, within the storage unit 736, within at least one of the processors 710 (e.g., within the processor's cache memory), or any suitable combination thereof, during execution thereof by the machine 700. Accordingly, the memory 732, the storage unit 736, and the memory of processors 710 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 716. The term "machine-readable medium" shall also be taken to include any medium, or combination of multiple media, that is capable of storing instructions (e.g., instructions 716) for execution by a machine (e.g., machine 700), such that the instructions, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762 among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 762 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via coupling 782 and coupling 772 respectively. For example, the communication components 764 may include a network interface component or other suitable device to interface with the network 780. In further examples, communication components 764 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a Universal Serial Bus (USB)).

Moreover, the communication components 764 may detect identifiers or include components operable to detect identifiers. For example, the communication components 764 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 780 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network and the coupling 782 may be a Code Division Multiple Access (CDMA) connection, a Global System for Mobile communications (GSM) connection, or other type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., hypertext transfer protocol (HTTP)). Similarly, the instructions 716 may be transmitted or received using a transmission medium via the coupling 772 (e.g., a peer-to-peer coupling) to devices 770. The term "transmission medium" shall be taken to include any intangible medium that is capable of storing, encoding, or carrying instructions 716 for execution by the machine 700, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A system comprising:
an authentication server comprising a communication interface and a Representational State Transfer ("REST") tunneling module to allow a client device to obtain first information from a first service provider and second information from a second service provider without violating a single-domain policy, the first service provider being at a first domain and the second service provider being at a second domain,
the communication interface, using at least one processor, configured to, at least:
receive a first request from the client device, the first request being for the first information, the first information being provided by the first service provider; and
receive a second request from the client device, the second request being for the second information, the second information being provided by the second service provider; and
the REST tunneling module, using at least one processor, configured to, at least:
based on the first request specifying a URI for accessing the first information via a REST-based tunnel, establish the REST-based tunnel and send the first request to the first service provider using the REST-based tunnel;
receive the first information from the first service provider;
based on the second request specifying a second URI for accessing the second information via the REST-based tunnel, send the second request to the second service provider using the REST-based tunnel;
receive the second information from the second service provider; and
wherein the communication module provides the first information and the second information to the client device, the first information and the second information being used in an application instantiated by the client device.

2. The system of claim 1, wherein the first request comprises a tunnel destination received from the client device, the tunnel destination identifying the first provider selected from a plurality of service providers as the destination for the tunnel.

3. The system of claim 1, further comprising:
an authentication module, using at least one processor, to authenticate a user of the client device with an authentication server; and
wherein the first information and the second information are provided to the client device based on the user being authenticated.

4. The system of claim 1, wherein the first domain and the second domain each comprise a different second-level domain name.

5. The system of claim 1, wherein an authentication server has been previously authenticated with the first service provider and the second service provider, the authentication server comprising at least one of the communication interface or the REST tunneling module.

6. The system of claim 1, wherein:
the first request for the first information is sent to the first service provider via a first intermediary server in communication with an authentication server and the first service provider, the first intermediary server having been previously authenticated with the authentication server and the service provider.

7. The system of claim 1, wherein the first request for the first information comprises a Uniform Resource Identifier ("URI"), the URI having at least one of a back-end host identifier that identifies a back-end host, a port identifier that identifies a port of the back-end host, a node path identifier that identifies a node of the back-end host that implements the tunnel, a tunnel destination identifier that identifies the first service provider, a service root identifier that identifies a service of the first service provider, and a resource path identifier that identifies a resource provided by the service provider, the resource comprising the first information.

8. A method comprising:
incorporating a communication interface and a Representational State Transfer ("REST") tunneling module into an authentication server, the communication interface and the REST tunneling module configuring one or more computer processors of the authentication server to perform operations to allow a client device to obtain first information from a first service provider and second information from a second service provider without violating a single-domain policy, the first service provider being at a first domain and the second service provider being at a second domain, the operations comprising:
receiving, at the authentication server, a request for the first information;
based on the request for the first information specifying a URI for accessing the first information via a REST-based tunnel, establishing the REST-based tunnel and sending the request to the first service provider using the REST-based tunnel;
receiving the first information from the first service provider;
receiving, at the authentication server, a request for the second information;
based on the second request for the second information specifying a second URI for accessing the second information via the REST-based tunnel, sending the request for the second information to the second service provider using the REST-based tunnel;
receiving the second information from the second service provider; and
providing the first information and the second information to the client device in communication with the authentication server, the first information and the second information being used in an application instantiated by the client device.

9. The method of claim 8, wherein the request comprises a tunnel destination received from the client device, the tunnel destination identifying the first provider selected from a plurality of service providers as the destination for the tunnel.

10. The method of claim 8, further comprising authenticating a user of the client device with the authentication server; and
wherein the first information and the second information are provided to the client device based on the user being authenticated.

11. The method of claim 8, wherein the first domain and the second domain each comprise a different second-level domain name.

12. The method of claim 8, wherein the authentication server has been previously authenticated with the first service provider and the second service provider.

13. The method of claim 8, wherein:
the request for the first information is sent to the first service provider via a first intermediary server in communication with the authentication server and the first service provider, the first intermediary server having been previously authenticated with the authentication server and the service provider.

14. The method of claim 8, wherein the request for the first information comprises a Uniform Resource Identifier ("URI"), the URI having at least one of a back-end host identifier that identifies a back-end host, a port identifier that identifies a port of the back-end host, a node path identifier that identifies a node of the back-end host that implements the tunnel, a tunnel destination identifier that identifies the first service provider, a service root identifier that identifies a service of the first service provider, and a resource path identifier that identifies a resource provided by the service provider, the resource comprising the first information.

15. A non-transitory machine-readable storage medium having computer-executable instructions stored thereon that, when executed by one or more processors, cause the one or more processors to perform operations to allow a client device to obtain first information from a first service provider and second information from a second service provider, the first service provider being at a first domain and the second service provider being at a second domain, without violating a single-domain policy, the operations comprising:
receiving, at the authentication server, a request for the first information;
based on the request for the first information specifying a URI for accessing the first information via a REST-based tunnel, establishing the REST-based tunnel and sending the request to the first service provider using the REST-based tunnel;
receiving the first information from the first service provider;
receiving, at the authentication server, a request for the second information;
based on the second request for the second information specifying a second URI for accessing the second information via the REST-based tunnel, sending the request for the second information to the second service provider using the REST-based tunnel;
receiving the second information from the second service provider; and
providing the first information and the second information to a client device in communication with the authentication server, the first information and the second information being used in an application instantiated by the client device.

16. The machine-readable medium of claim 15, wherein the operations further comprise authenticating a user of the client device with the authentication server; and the first information and the second information are provided to the client device based on the user being authenticated.

17. The machine-readable medium of claim 15, wherein the first domain and the second domain each comprise a different second-level domain name.

18. The machine-readable medium of claim 15, wherein the authentication server has been previously authenticated with the first service provider and the second service provider.

19. The machine-readable medium of claim 15, wherein:
the request for the first information is sent to the first service provider via a first intermediary server in communication with the authentication server and the first service provider, the first intermediary server having been previously authenticated with the authentication server and the service provider.

20. The machine-readable medium of claim 15, wherein the request for the first information comprises a Uniform Resource Identifier ("URI"), the URI having at least one of a back-end host identifier that identifies a back-end host, a port identifier that identifies a port of the back-end host, a node path identifier that identifies a node of the back-end host that implements the tunnel, a tunnel destination identifier that identifies the first service provider, a service root identifier that identifies a service of the first service provider, and a resource path identifier that identifies a resource provided by the service provider, the resource comprising the first information.

* * * * *